(12) United States Patent
Hirai

(10) Patent No.: US 6,424,469 B2
(45) Date of Patent: Jul. 23, 2002

(54) LENS BARREL

(75) Inventor: Futoshi Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/776,829

(22) Filed: Feb. 5, 2001

(30) Foreign Application Priority Data

Feb. 10, 2000 (JP) ........................................ 2000-033146

(51) Int. Cl.[7] .............................. G02B 15/14; G02B 7/02
(52) U.S. Cl. ........................ 359/699; 359/700; 359/823
(58) Field of Search ................................ 359/823, 826, 359/699, 700, 701, 703, 704; 396/75, 85; 348/349

(56) References Cited

U.S. PATENT DOCUMENTS 5,589,987 A * 12/1996 Tanaka ........................ 359/701
5,912,772 A * 6/1999 Aoki ............................ 359/701
6,243,214 B1 * 6/2001 Miyamoto ................... 359/700

* cited by examiner

Primary Examiner—Georgia Epps
Assistant Examiner—Saeed Seyrafi
(74) Attorney, Agent, or Firm—Robin, Blecker & Daley

(57) ABSTRACT

A lens barrel has a cam tube having a cam groove formed on an inner circumferential side thereof. The cam groove has a first cam groove area over which a lens unit slides when the lens barrel is used for photo-taking and a second cam groove area over which the lens unit slides when the lens barrel is not used for photo-taking. A taper angle of a side wall surface of the first cam groove area differs from a taper angle of a side wall surface of the second cam groove area. The large taper angle facilitates removal of a mold from the cam tube at the time of manufacture. The arrangement also permits the first cam groove area which is for photo-taking to have a small taper angle, so that the lens unit can be accurately moved in the first cam groove area.

6 Claims, 5 Drawing Sheets

FIG.4(A)  FIG.4(B)
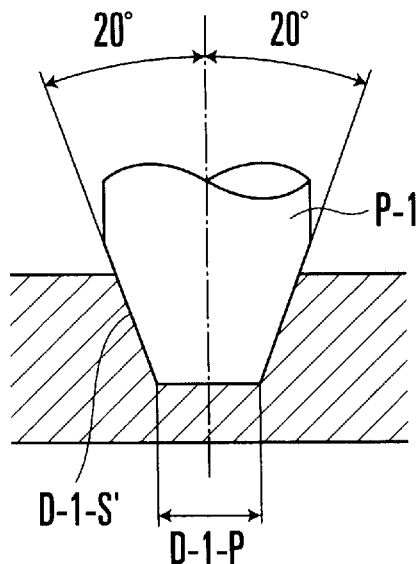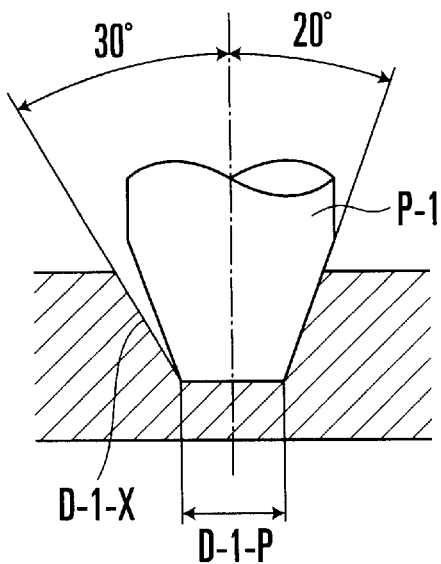
FIG.5
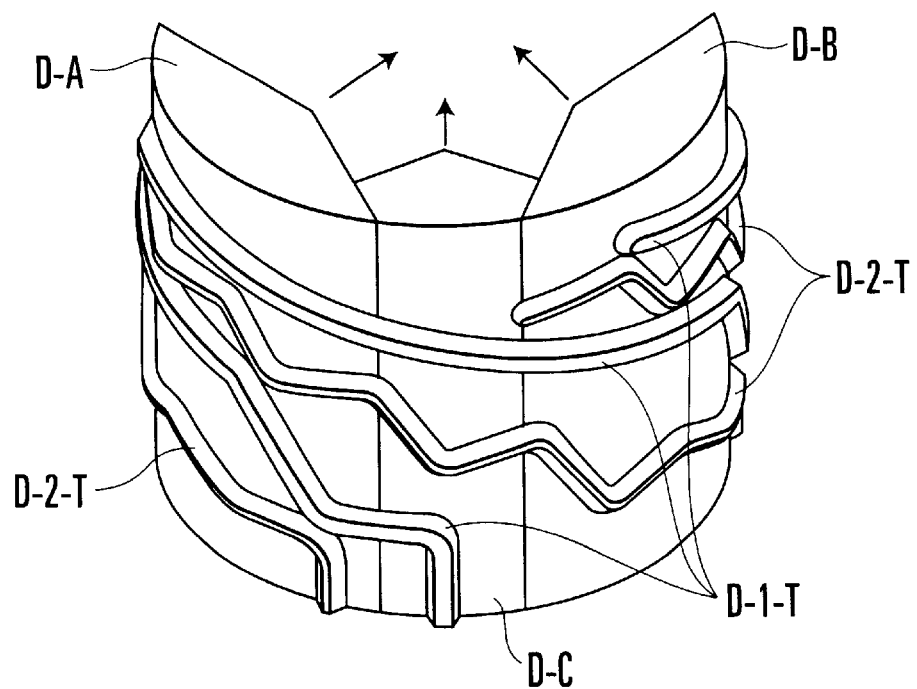

LENS BARREL

BACKGROUND OF THE INVENTION

1. Field of the Invention

The present invention relates to a lens barrel mounted on a camera, and more particularly to a cam tube of the lens barrel, which is provided with a cam groove for driving the component members of the lens barrel through a cam.

2. Description of Related Art

In a case where a cam tube having a cam groove on the inner circumferential side thereof is to be formed with a synthetic resin such as a plastic material by injection molding, a mold for forming the inner wall of the cam tube, which is divided into a plurality of parts, for example, six parts, is used in many cases.

FIG. 5 schematically shows the arrangement of inner-diameter slide pieces (molds) to be used for forming the inner cicumferential surface of a cam tube. The inner-diameter slide pieces are, in fact, composed of a total of six pieces, i.e., three large slide pieces and three small slide pieces. In FIG. 5, reference charcters D-A and D-B denote the large slide pieces, and reference character D-C denotes the small slide piece, while the remaining one large slide piece and two small slide pieces are omitted from the illustration. Each of these slide pieces is provided with a projection D-1-T for molding a cam groove for a first lens group and a projection D-2-T for molding a cam group for a second lens group.

When a plastic material is injected to the outer circumferential side of the slide pieces and is then cooled, a mold removing process is performed by moving the small slide piece D-C first toward an optical axis (the center axis of a cylindrical shape) to leave a gap space there and then moving the large slide pieces D-A and D-B toward the optical axis utilizing the gap space formed by the movement of the small slide piece D-C.

All of the slide pieces are thus removed by pulling them off toward the optical axis. To be exact, however, it is only a middle part of every slide piece, as viewed in the circumferential direction thereof, that is pulled off toward the optical axis. The end parts of each slide piece located away from the middle part in the circumferential direction move in the direction parallel with the direction toward the optical axis, instead of moving toward the optical axis. Therefore, the parts of the cam groove to be molded by the circumferential end parts of the large slide pieces D-A and D-B, particularly, such parts that have a large lead, must be formed to have their cam-groove side wall surfaces tapered at a large angle. In other words, these parts must be formed to have such tapered surfaces that are widely open with respect to the direction toward the center line of the cam tube.

Heretofore, the taper angle of side wall surfaces of a cam groove which is considered to be necessary for the two end parts of the large slide piece has been decided according to the allocation of the inner-diameter slide pieces. Further, all the areas of the cam groove are formed at a maximum necessary taper angle. If the taper angle is obtuse, cam followers tend to come off the cam groove when a strong impact is inflicted on the lens barrel in the direction of a photo-taking optical axis.

According to an arrangement disclosed in Japanese Laid-Open Patent Application No. Hei 7-43581, to increase the strength of the edges of a cam groove formed in a cam tube, the taper angle of a side wall surface on one side of the cam groove is gradually increased while another side wall surface on the other side of the cam groove is formed to have a small taper angle.

FIG. 6 shows the arrangement of a lens barrel disclosed in the above Japanese Laid-Open Patent Application No. Hei 7-43581. As shown in FIG. 6, the lens barrel is composed of a rectilinear motion member 101 which has penetrating helical cam grooves 101a, and a rotary member 102 which has cam followers 102a press-fitted therein. The movement of the rotary member 102, i.e., the cam followers 102a, in the direction of the groove width of each of the cam grooves 101a is arranged to be restrained by the groove width of the helical cam groove 101a.

Then, in the helical cam groove 101a, there are continuously formed a part where the rotary member 102 is cam-driven within a photo-taking movable range in which the rotary member 102 is movable at the time of photo-taking (a zoom-and-focusing range) and another part where the rotary member 102 is cam-driven within a non-photo-taking movable range in which the rotary member 102 is movable when no photo-taking operation is performed (a stowing range).

However, according to the arrangement disclosed in the above Japanese Laid-Open Patent Application No. Hei 7-43581, the wall surfaces on two sides of the helical cam groove 101a have different taper angles not only at the cam driving part for the rotary member 102 within the non-photo-taking movable range but also at the cam driving part within the photo-taking movable range.

Therefore, it is necessary, for preventing an adverse effect on the focusing accuracy, not to use the two side wall surfaces for preventing the rotary member 102 from moving in the direction of the groove width of the cam groove but to use only the width of the cam groove for preventing the movement in the direction of the groove width of the cam groove. In order to prevent the movement of the rotary member 102 in the direction of the groove width solely by the width of the cam groove, the cam groove must be formed in a penetrating shape as a through groove. The arrangement as mentioned above, therefore, cannot be used in cases where it is impossible to have the cam groove formed as such a through groove.

Further, with a cam groove formed in the inner wall of the cam tube, the taper angle of the side wall surface of the cam groove considered to be necessary at the two end parts of the large slide piece is decided according to the allocation of the inner-diameter slide pieces, as mentioned above. A taper angle of the side wall surface of the cam groove considered to be necessary at the middle part of the inner-diameter slide piece is, therefore, smaller than the taper angle considered to be necessary at the two ends of the inner-diameter slide piece. However, the cam groove is formed to have all side wall surfaces at a certain fixed taper angle. Therefore, the taper angle which is considered necessary only for the end parts of the inner-diameter slide piece is applied to the whole cam groove. As a result, the taper angle of the side wall surfaces is too large for the cam groove as a whole. Hence, the cam follower is apt to come off the cam groove when the lens barrel happens to receive an external force.

BRIEF SUMMARY OF THE INVENTION

It is an object of the invention to provide a lens barrel including a cam tube arranged to have a non-penetrating cam groove, which is formed on an inner circumferential side of the cam tube in such a way as to make the taper angle of side wall surfaces of the cam groove as small as possible.

To attain the above object, in accordance with an aspect of the invention, there is provided a lens barrel, which comprises a cam tube having a cam groove formed on an inner circumferential side thereof, the cam groove having a first cam groove area over which a lens unit slides when the lens barrel is used for photo-taking and a second cam groove area over which the lens unit slides when the lens barrel is not used for photo-taking, wherein a taper angle of a side wall surface of the first cam groove area differs from a taper angle of a side wall surface of the second cam groove area.

Further, in the lens barrel, the taper angle of the side wall surface of the second cam groove area is larger than the taper angle of the side wall surface of the first cam groove area.

Further, in the lens barrel, of both side wall surfaces of the second cam groove area, a taper angle of one side wall surface differs from a taper angle of the other side wall surface.

Further, in the lens barrel, the first cam groove area is a cam groove for varying a focal length.

Further, in the lens barrel, the second cam groove area is a cam groove for stowing the lens unit in a camera body.

Further, there is provided a camera comprising the above lens barrel.

These and further objects and features of the invention will become apparent from the following detailed description of a preferred embodiment thereof taken in connection with the accompanying drawings.

BRIEF DESCRIPTION OF THE SEVERAL VIEWS OF THE DRAWING

FIGS. 4(A) and 4(B) are diagrams for explaining the state of engagement between a cam groove formed in the cam tube and a cam pin provided on a rectilinear motion tube.

FIG. 5 is a diagram for explaining inner-diameter slide pieces for use in molding a conventional cam tube.

DETAILED DESCRIPTION OF THE INVENTION

Hereinafter, a preferred embodiment of the invention will be described in detail with reference to the drawings.

Figure 1:
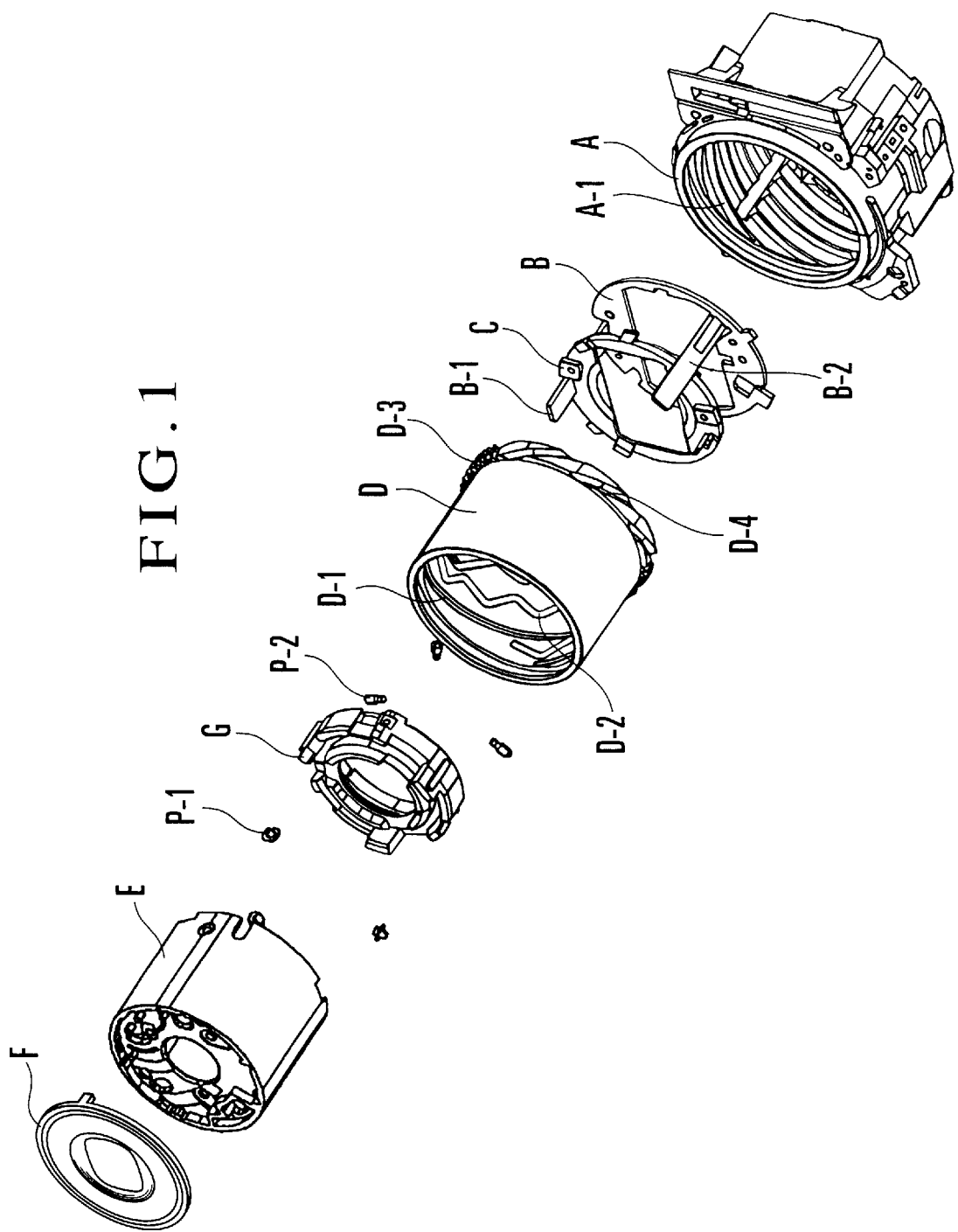
FIG. 1 is an exploded perspective view showing a lens barrel using a cam tube according to an embodiment of the invention.

FIG. 1 shows in an exploded perspective view a lens barrel using a cam tube according to the embodiment of the invention. The lens barrel is adapted for cameras of varied kinds, such as a silver-halide camera, a digital camera, a video camera, etc. However, in the following description, the lens barrel is assumed to be used for the silver-halide camera.

Referring to FIG. 1, a fixed tube A is arranged to be secured to a camera body (not shown). A cam tube D is inscribed to the fixed tube A and is arranged to be movable along an optical axis while rotating around the optical axis. A rectilinear motion tube E is inscribed to the cam tube D and is arranged to be movable along the optical axis without rotating around the optical axis. A lens group (not shown) is disposed inside the rectilinear motion tube E. In the present embodiment, the lens barrel is of a two-step drawn-out type in which the lens barrel expands and contracts with the cam tube D and the rectilinear motion tube B moving along the optical axis.

A rotation preventing member B is integrally combined with a rotation-preventing-member mounting member C and is incorporated into the cam tube D in a state of being rotatable relative to the cam tube D around the optical axis and having its movement in the optical axis direction restricted by the cam tube D. The rotation preventing member B is thus arranged to have its rotation prevented by the fixed tube A and to move along the optical axis together with the cam tube D without rotating around the optical axis.

While the rotation preventing member B and the rotation-preventing-member mounting member C are formed separately from each other in the case of the present embodiment, they may be molded together in one body.

The cam tube D rotates when a rotative driving force is applied from outside to a gear part D-3 which is formed at the rear end on its outer circumferential side. In that instance, the cam tube D is driven to move along the optical axis by the engagement of the gear part D-3 and a helicoid D-4 which is formed also at the rear end in an area where the gear part D-3 is not formed with a helicoid A-1 which is provided on the inner side of the fixed tube A.

The rectilinear motion tube E is driven to move along the optical axis by the engagement of a first-lens-group pin P-1 which is mounted on the outer circumferential side of the rectilinear motion tube E by press fitting or the like with a first-lens-group cam groove D-1 which is formed on the inner circumferential side of the cam tube D, while being prevented from rotating around the optical axis by arm parts B-1 and B-2 formed on the rotation preventing member B. Further, while the first-lens-group pin P-1 and the rectilinear motion tube E are formed separately from each other in the case of the present embodiment, they may be molded together in one body.

A lens group holder G, which contains therein a lens group (not shown), is driven to move along the optical axis by the engagement of a second-lens-group pin P-2 which is provided on the outer circumferential side of the lens group holder G with a second-lens-group cam groove D-2 which is formed on the inner circumferential side of the cam tube D, while being prevented from rotating around the optical axis by the rectilinear motion tube E. The movement along the optical axis of the lens group holder G is made in such a way as to perform a magnification varying action and a focusing action. Further, while the second-lens-group pin P-2 and the lens group holder G are formed separately from each other in the case of the present embodiment, they may be molded together in one body. Reference symbol F denotes a front cover arranged to cover the front end surface of the rectilinear motion tube E.

Figure 2:
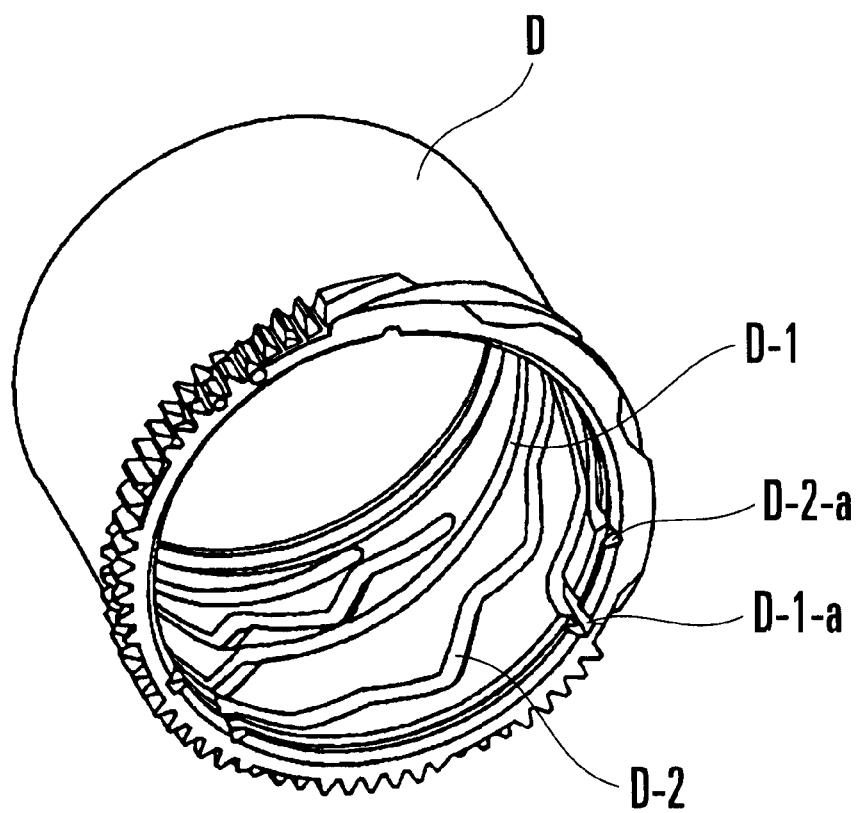
FIG. 2 is a perspective view showing the cam tube.

FIG. 2 is a perspective view of the cam tube D as viewed from the rear side of the optical axis (from the side of a film surface). In FIG. 2, reference character D-1-a denotes a first-lens-group-pin introducing part of the first-lens-group cam groove D-1 to be used for introducing the first-lens-group pin P-1 into the first-lens-group cam groove D-1 in assembling, and reference character D-2-a denotes a second-lens-group-pin introducing part of the second-lens-group cam groove D-2 to be used for introducing the second-lens-group pin P-1 into the second-lens-group cam groove D-2 in assembling. At the time of assembly, the lens groups are fitted into the cam tube D through these introducing parts D-1-a and D-2-a.

Figure 3:
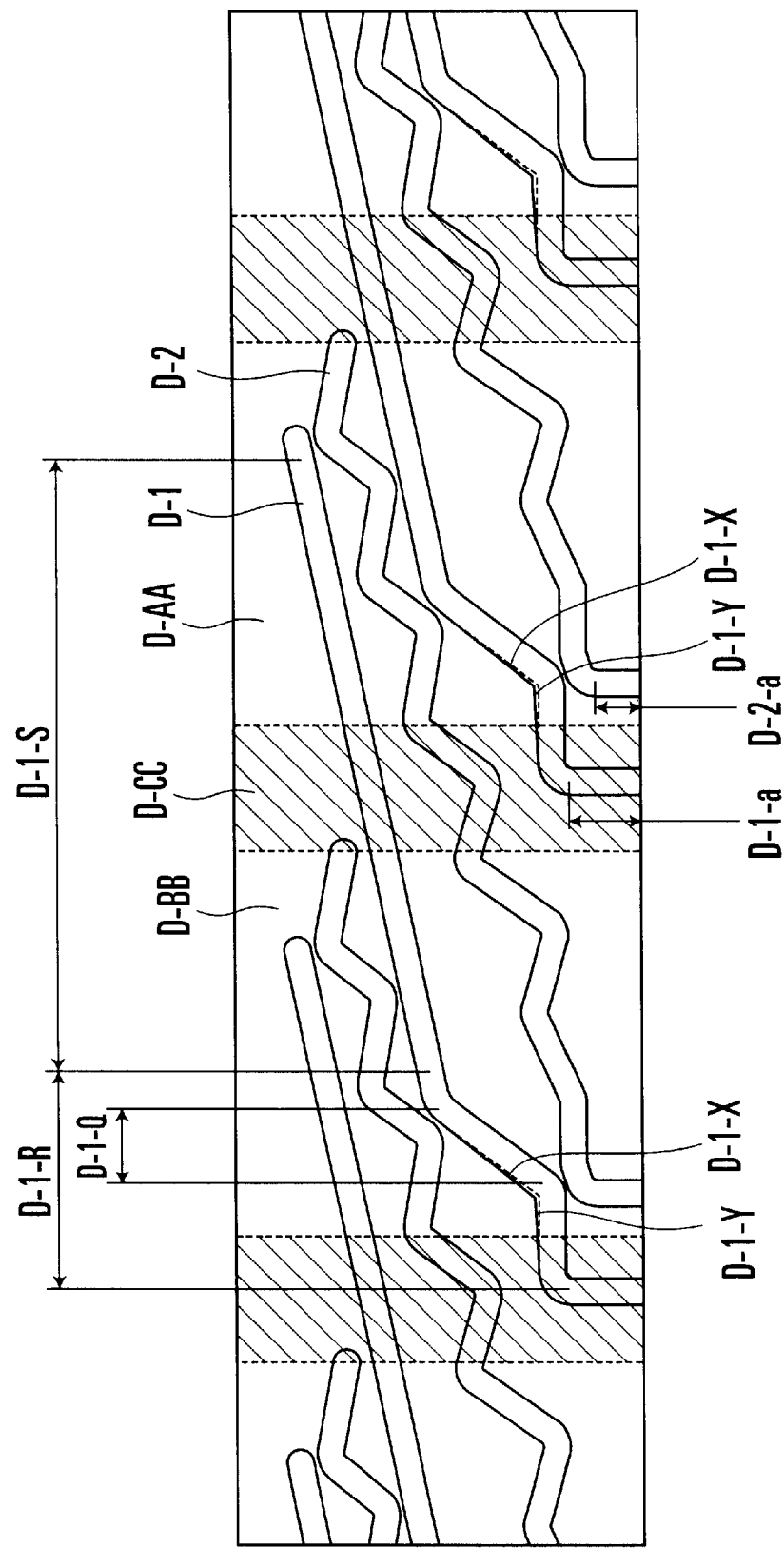
FIG. 3 is a development view showing the inner circumferential side of the cam tube.
Figure 6:
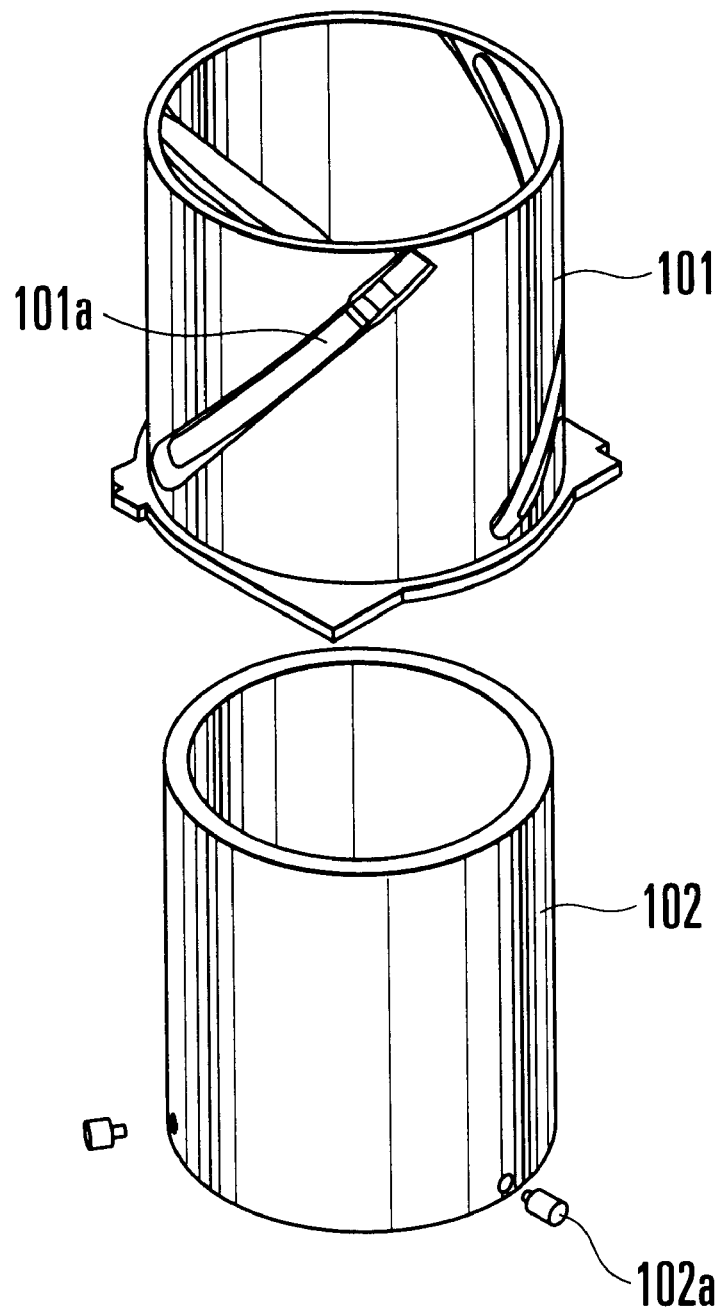
FIG. 6 is a diagram showing the arrangement of a lens barrel using a conventional cam tube.

FIG. 3 is a development view showing the inner circumferential side of the cam tube D. The upper side of the cam tube D as viewed in FIG. 3 is located on the side of the object to be photographed. In the case of the present embodiment, the invention is applied, by way of example, to the first-lens-group cam groove D-1. Each of the first-lens-group cam groove D-1 and the second-lens-group cam groove D-2 is composed of three grooves which are formed 120 degrees away from one another in the circumferential direction of the cam tube D. However, the number of these groove parts is not limited to three.

In FIG. 3, each of three areas D-CC indicated with hatching represents an inner wall surface to be molded by the small slide piece D-C shown in FIG. 5. Other areas D-AA and D-BB represent inner wall surfaces to be molded by the large slide pieces D-A and D-B shown in FIG. 5.

The first-lens-group cam groove D-1 has a photo-taking cam area (a first cam groove area) D-1-S in which the rectilinear motion tube E is driven to move along the optical axis for varying the zooming state (position) of the lens barrel between a wide-angle end and a telephoto end, and a non-photo-taking cam area (a second cam groove area) D-1-R including a drawing-in cam part D-1-Q in which the rectilinear motion tube E is driven to move along the optical axis for expanding and contracting the lens barrel, relative to the camera body, between the wide-angle end and a drawn-in end, and the above-mentioned first-lens-group-pin introducing part D-1-a.

Meanwhile, the second-lens-group cam groove D-2 has a photo-taking cam area (an area formed correspondingly with the photo-taking cam area D-1-S of the first-lens-group cam groove D-1) in which the lens group holder G is driven to move along the optical axis for varying stepwise the zooming state of the lens barrel between the wide-angle end and the telephoto end and, at the same time, for varying the focusing position of the lens barrel between a nearest distance position and an infinity distance position at each of zoom positions arranged stepwise, and a non-photo-taking cam area (an area formed correspondingly with the non-photo-taking cam area D-1-R of the first-lens-group cam groove D-1) including a drawing-in cam part in which the lens group holder G is held at the wide-angle end position between the wide-angle end and the drawn-in end, and the above-mentioned second-lens-group-pin introducing part D-2-a.

When the main switch of the camera is turned on by the user while the lens barrel is at a drawn-in position with respect to the camera body, the cam tube D receives a driving force of a motor (not shown). The cam tube D is thus caused to move forward along the optical axis while rotating around the optical axis. The rectilinear motion tube E is then caused by the first-lens-group cam groove D-1 to move up to a stand-by position (not shown) which is set in the non-photo-taking cam area D-1-R immediately before the photo-taking cam area D-1-S. The lens group holder G is likewise caused to move to a stand-by position by the second-lens-group cam groove D-2. Thus, the non-photo-taking cam area D-1-R is a cam groove for causing the lens unit to move to a stowed position with respect to the camera body or to move from the stowed position to a photo-taking stand-by position.

While the camera is in photo-taking operation, the rectilinear motion tube E and the lens group holder G are caused to be driven to move along the optical axis by the photo-taking cam areas of the cam grooves D-1 and D-2 for the magnification varying action or the focusing action.

In the non-photo-taking cam area D-1-R of the first-lens-group cam groove D-1, there is included the drawing-in cam part D-1-Q, which has a lead larger than the lead of the photo-taking cam area D-1-S in the case of the present embodiment. In order to decrease the taper angle of the side wall surfaces of the cam groove (i.e., to make the side wall surfaces of the cam groove so tapered as to close with respect to the direction toward the center line of the cam tube D), it is desirous to have the drawing-in cam part D-1-Q allocated in the middle part in the circumferential direction of the large slide piece. Such an allocation is, however, impossible in many cases, because focusing accuracy might be affected by some mold parting line left after molding.

The present embodiment is, therefore, arranged to make mold preparation possible by solving the above-stated problem as follows. The taper angle of a side wall surface D-1-X that is one of the two side wall surfaces of the drawing-in cam part D-1-Q, which are required to increase the taper angle of the side wall surfaces of the cam groove (i.e., to make the side wall surfaces of the cam groove so tapered as to open with respect to the direction toward the center line of the cam tube D) in view of mold preparation, is arranged to gradually become larger than the taper angle of the photo-taking cam area D-1-S from the side of the photo-taking cam area D-1-S toward the side of the first-lens-group-pin introducing part D-1-a.

FIG. 4(A) shows the state of engagement of the first-lens-group pin P-1 with the photo-taking cam area D-1-S. The taper angle of each of the side wall surfaces D-1-S' on both sides of the photo-taking cam area D-1-S are set at 20 degrees with respect to the center line of the cam groove. In the photo-taking cam area D-1-S, the side wall surfaces D-1-S' on both sides are approximately in tight contact with the outer circumferential surface of the first-lens-group pin P-1.

FIG. 4(B) shows the state of engagement of the first-lens-group pin P-1 with the drawing-in cam part D-1-Q of the non-photo-taking cam area D-1-R. The taper angle of the side wall surface D-1-X on one side of the drawing-in cam part D-1-Q is set at 30 degrees with respect to the center line of the cam groove, while the taper angle of the side wall surface on the other side of the drawing-in cam part D-1-Q is set at 20 degrees. Incidentally, the above change in the taper angle of the drawing-in cam part D-1-Q of the non-photo-taking cam area D-1-R is made with the groove bottom width D-1-P of the drawing-in cam part D-1-Q arranged to be the same as the groove bottom width D-1-P of the photo-taking cam area D-1-S.

In the arrangement described above, there arises a clearance between the first-lens-group pin P-1 and the side wall surface D-1-X on one side of the drawing-in cam part D-1-Q. However, since the drawing-in cam part D-1-Q is a cam area which the first-lens-group pin P-1 engages only when the lens barrel is not used for photo-taking, the accuracy of focusing is never affected by this arrangement. Further, the above-stated taper angles of side wall surfaces of the cam groove are shown only by way of example. These angles may be changed to any other suitable angles.

Further, in the present embodiment, in order to ensure that the first-lens-group pin P-1 is accurately placed into the first-lens-group cam groove D-1 at the time of assembly, the taper angle of the side wall surface D-1-Y of a part connecting the drawing-in cam part D-1-Q to the first-lens-group-pin introducing part D-1-a is gradually decreased from the maximum taper angle of the side wall surface D-1-X of the drawing-in cam part D-1-a in such a way that the taper angle of the side wall surfaces of the first-lens-group-pin introducing part D-1-a become equal to the taper angle of the photo-taking cam area D-1-S (see FIG. 4(A)).

The embodiment described above is arranged to enlarge the taper angle of the side wall surface of only the nonphoto-taking cam area in the first-lens-group cam groove D-1 for driving the rectilinear motion tube E which is apt to receive external forces. The arrangement, however, may be changed to likewise enlarge the taper angle of the side wall surface of the non-photo-taking cam area of the second-lens-group cam groove D-2 as well.

Further, in the case of the embodiment described above, the cam tube D is arranged to be molded with six divided inner-diameter slide pieces. The invention is applicable, however, also to a case where the cam tube is molded with a different number of divided inner-diameter slide pieces instead of the six divided pieces.

According to the invention, as has been described above, the first cam groove area which is to be used in photo-taking is molded into a shape of having the side wall surface tapered at a small angle, and the second cam groove area which is to be used while the lens barrel is not used for photo-taking is molded into a shape of having the side wall surface tapered at a large angle. The invention thus permits a cam tube to be prepared by molding without changing the structure of the conventional mold and yet to be capable of ensuring adequate focusing accuracy and to effectively prevent component members of the lens barrel from being caused to come off the cam grooves by external forces.

Further, in a case where an introducing part for introducing component members of the lens barrel into the cam groove is formed at a part of the second cam groove area on the side opposite to a part on the side of the first cam groove area, the component members of the lens barrel can be reliably assembled into the cam groove by arranging the taper angle of the side wall surfaces of the introducing part to be the same as the taper angle of the side wall surfaces of the first cam groove area.

What is claimed is:

1. A lens barrel comprising:

a cam tube having a cam groove formed on an inner circumferential side thereof, said cam groove having a first cam groove area over which a lens unit slides when said lens barrel is used for photo-taking and a second cam groove area over which said lens unit slides when said lens barrel is not used for photo-taking, wherein a taper angle of a side wall surface of said first cam groove area differs from a taper angle of a side wall surface of said second cam groove area.

2. A lens barrel according to claim 1, wherein the taper angle of the side wall surface of said second cam groove area is larger than the taper angle of the side wall surface of said first cam groove area.

3. A lens barrel according to claim 2, wherein, of both side wall surfaces of said second cam groove area, a taper angle of one side wall surface differs from a taper angle of the other side wall surface.

4. A lens barrel according to claim 1, wherein said first cam groove area is a cam groove for varying a focal length.

5. A lens barrel according to claim 1, wherein said second cam groove area is a cam groove for stowing said lens unit in a camera body.

6. A camera comprising a lens barrel according to claim 1.

* * * * *